Patented June 15, 1926.

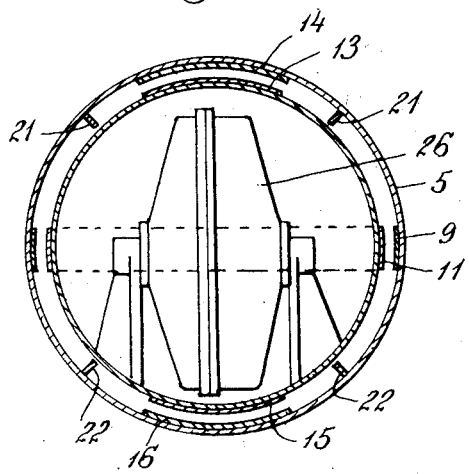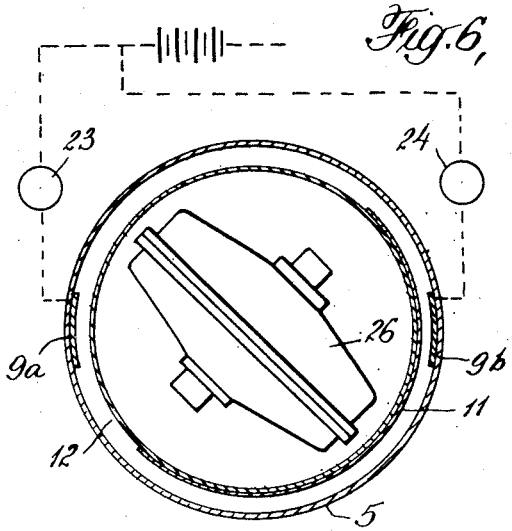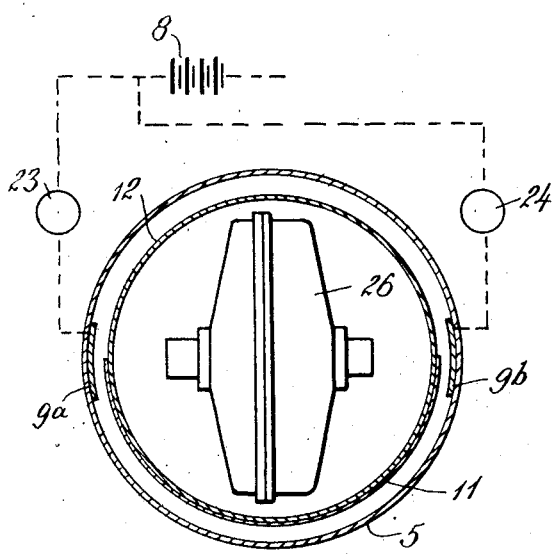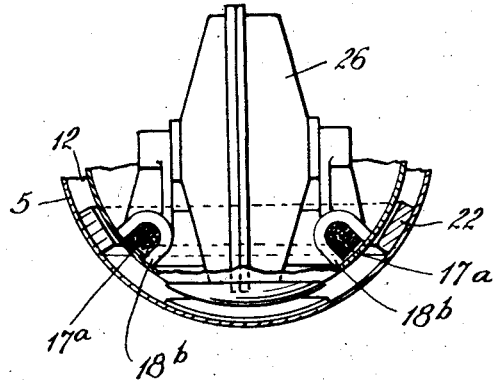

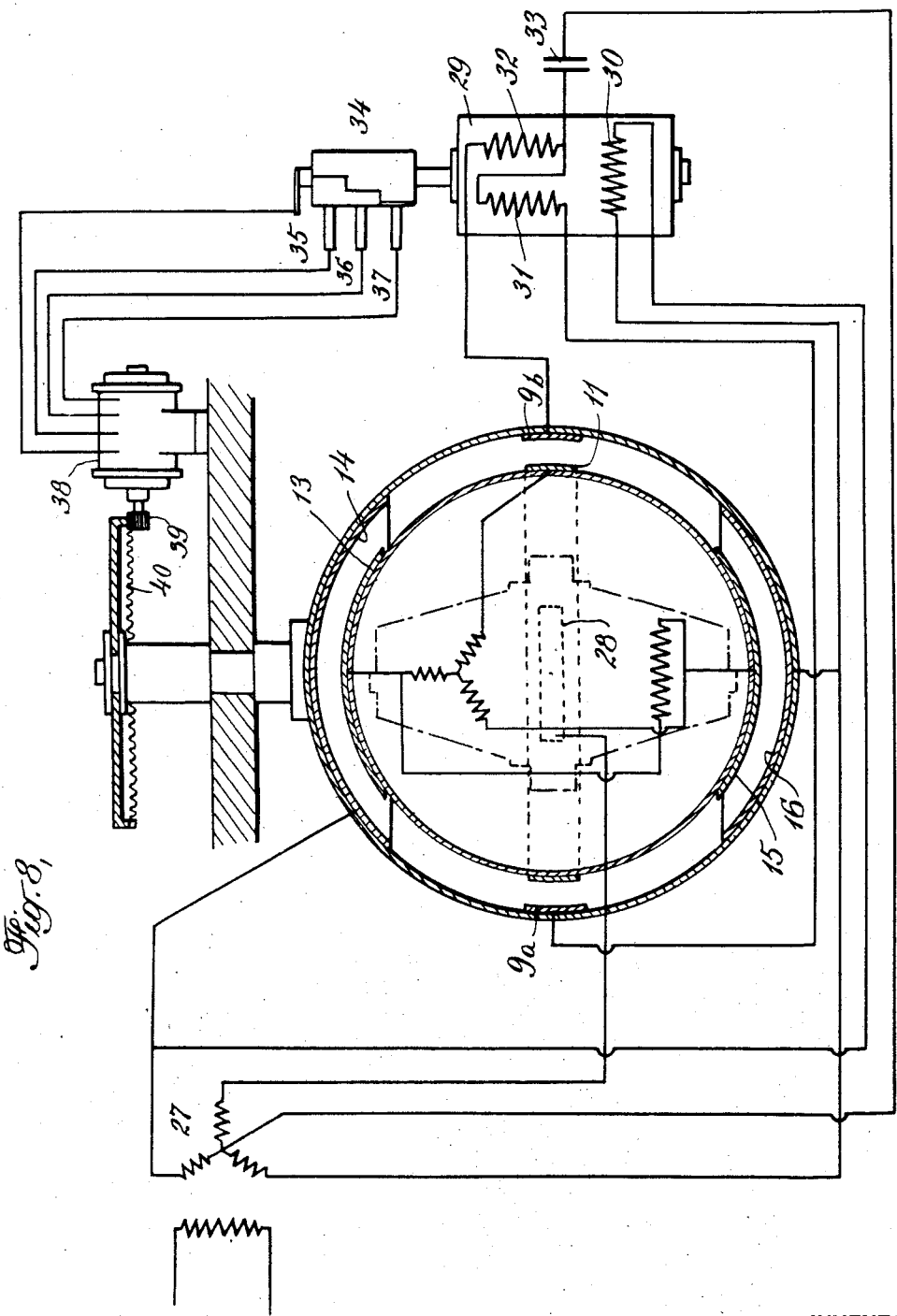

1,589,039

UNITED STATES PATENT OFFICE.

HERMANN ANSCHUTZ-KAEMPFE, OF MUNICH, GERMANY, ASSIGNOR TO NEDER-LANDSCHE TECHNISCHE HANDEL MAATSCHAPPIJ "GIRO," OF S'GRAVENHAGE, NETHERLANDS.

GYROSCOPIC APPARATUS.

Application filed February 14, 1923, Serial No. 618,984, and in Germany February 2, 1922.

This invention relates to gyroscopic apparatus for measuring and indicating purposes etc., such as gyroscopic compasses, artificial horizons and the like.

One of the objects of the invention is to reduce friction between parts of the apparatus so as to increase the accuracy of the indications and another object is to improve the certainty of operation by doing away with the movable conductors by which current is conducted into the indicating system of the apparatus and a further object is to reduce the cost of manufacture by simplifying the construction.

These objects are accomplished by placing the gyroscope or plurality of gyroscopes belonging to the gyroscopic system in a totally closed pressure-tight body or chamber which is totally submerged in a liquid. In accordance with the invention the said chamber containing the gyroscopic system floats freely in the said liquid and no point of it is in contact with any external solid body. The weight of the submerged chamber or body, which is preferably formed in the shape of a sphere, is made as nearly as possible equal to the weight of the supporting liquid which it displaces so that the remaining buoyancy or the tendency to sink is reduced to the utmost. It is well known that an absolute equality of the said two weights can never be accomplished and that it is only possible to obtain an approximate state of unstable equilibrium. Just as is impossible to adjust the weight of the submerged body, so that it will neither rise nor sink in the liquid, it is also impossible to prevent it from moving laterally from the vertical central line or axis of the apparatus. The position of the floating body in this respect is liable to alter in an incalculable manner unless centering forces are provided to counteract such alterations. An important feature of the invention consists in providing means which exert forces on the gyroscopic system that cause the latter to remain at a certain level in the liquid and also prevent it from moving in a horizontal direction and thus maintain it suspended in a certain position without its being in contact with any external solid holder or support. Experiments have shown that magnetic or electrical forces are suitable for accomplishing this result. Thus electromagnets energized by continuous current may be arranged above and below the spherical body suspended in the liquid and the said magnets may be made to exert attractive forces on iron armatures attached to the top and bottom poles of the sphere. If an arrangement is provided in connection with the said magnets by which, when the sphere commences moving towards a magnet, the current energizing this magnet is weakened while the current energizing the other magnet from which the sphere recedes is strengthened, the latter will be caused to assume a middle position between the two magnets without touching either of them, while at the same time lateral or horizontal movements of the sphere will be counteracted by the combined attractive force exerted by both magnets. The means by which the position of the sphere relatively to the two magnets may be controlled are various. This means may comprise a source of light that influences circuit controlling devices sensitive to light such as selenium cells and a shadow thrown on the cells or the like by the sphere may be arranged to give rise to the necessary switching operations. Another means may consist of a current conducting liquid enveloping the sphere, current conducting surfaces attached to the top and bottom poles of the sphere, and similar surfaces placed opposite to the former surfaces and attached to the suspended support of the apparatus. By suitable arrangements of circuits the magnitude of the electrical resistance of the liquid at each pole, and therefore the thickness of the layer of liquid, may be determined and used for regulating the exciting currents of the magnets.

The invention is shown in the drawing in which it is represented in a number of modifications.

Fig. 4 is a vertical section view, largely diagrammatic of a further modification.

Figs. 5 and 6 are diagrammatic representations of horizontal sections of another modification with the parts of this further modification in different positions and Fig. 7 is a fragmentary vertical section through yet another modified gyroscopic compass according to the invention.

Figure 8 is a diagrammatic representation of one embodiment of my invention including a follow-up system.

Figure 1:
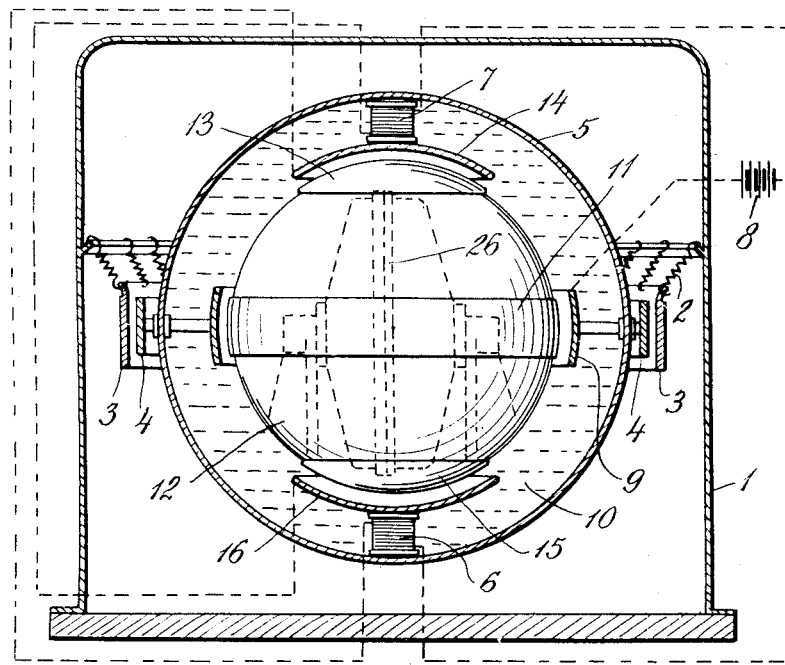
Fig. 1 is a vertical section through a gyroscopic compass according to the invention.

In Fig. 1 of the drawing, 1 is the external casing of the gyroscopic apparatus, 2 the spring suspension members of the supporting ring 3 and the gimbal ring 4, and 5 is the liquid container or holder which is unsealed and coated with insulation and carries continuous current magnets 6 and 7 at its top and bottom poles. The current flowing from the battery 8 flows through two branch paths one of which passes through the ring-shaped current conducting surface 9 the liquid 10, the equatorial current conducting surface 11 of the sphere 12 which consists of an electrical insulator, through the motor of the gyroscope 26, thence through the current conducting surface 13 at the upper pole, opposite current conducting surface 14 through the bottom magnet 6 back to the battery 8. The other branch path may be traced from the battery through 9, 11, 26, current conducting surfaces 15 and 16 at the bottom pole, top magnet 7, back to the battery. From these circuits it will appear that when the sphere 12 rises in its supporting liquid the gap between 15 and 16 is widened so that the resistance of this part of the circuit is increased to diminish the attractive force of the upper magnet 7, while at the same time the narrowing of the gap between the surfaces 13 and 14 reduces the resistance at this part of the circuit to increase the attractive force of the lower magnet 6. Both of these effects serve to return the sphere 12 to its central position. In reality such movements of the sphere will only occur when the current from the battery 8 is switched on, and when the apparatus is in operation the sphere settles and remains stationary on account of the damping action of the liquid. In order to minimize electrolytic effects, the direction of the current from the battery 8 is reversed at regular intervals.

It is to be understood that while I have shown in diagrammatic form an inner casing or sphere 12 containing a single gyroscopic unit, this invention may be employed to equal advantage with a system employing any number of gyroscopic units.

Instead of using a continuous current, alternating current may be employed for maintaining the floating sphere in its freely suspended position. To this end the well known property of alternating current coils is utilized which consists in such coils, (when they are suitably dimensioned and excited by current of the proper frequency), exerting a repelling effect on electrical conductors due to the eddy currents induced therein. An arrangement of this kind is diagrammatically represented in section in Fig. 2. In this figure 12 represents a sphere consisting of a good metallic conductor such as copper or aluminum, 5 is the liquid container or holder and 17, 17 are repelling alternating current coils which act from all sides on the sphere in such a manner that the sphere is kept in its normal position both vertically and horizontally.

Figure 2:
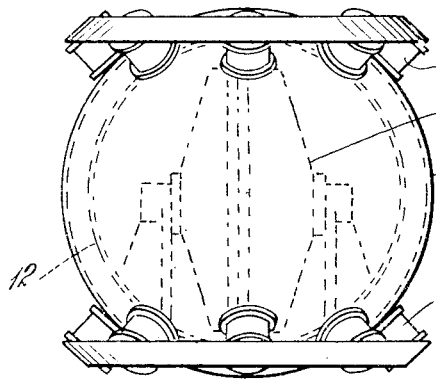
Fig. 2 represents an elevation of a modified form of the invention.
Figure 3:
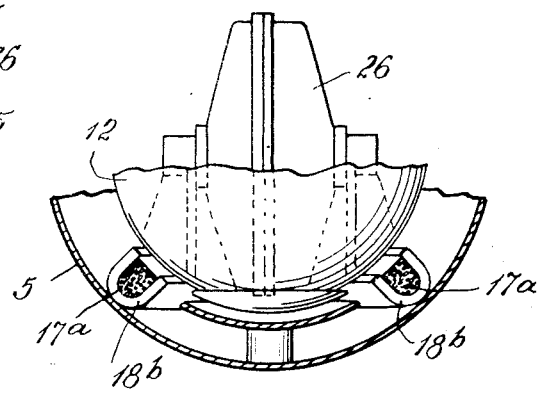
Fig. 3 is a fragmentary vertical section view of a modified form of the apparatus.

Since the floating indicating system is not a uniform body, but contains the gyroscope motors driven by continuous or alternating current, the fields produced by the alternating coils according to Fig. 2 might, under certain conditions, penetrate the metallic wall of the sphere 12 and exert small turning movements on the gyroscopic system. This difficulty is avoided in accordance with the invention by shaping the alternating current coils in a suitable manner so that they form grooved rings as shown in Figs. 3 and 7. In Fig. 3, 12 is the floating indicating system, 17$^a$ a ring-shaped winding, whose axis coincides with the vertical axis of the indicating system, and 18$^b$ is the magnetized iron of the coil in the form of a ring of U-shaped cross section. A modified construction might consist of magnets placed in the interior of the sphere and arranged to act on exterior iron surfaces or alternating current coils placed in the interior of the sphere as shown in Fig. 7, and exerting repelling forces on metallic bodies attached to the suspension members of the apparatus. It will be understood that a number of coils 17$^a$ may be employed inside the sphere 12. These coils are supported in annular grooves of U-shaped cross-section, and these annular supports are preferably constructed out of metal which will shield the effects of current flowing into the coils, from the gyroscopic apparatus contained within the sphere.

In all the described modifications the important result is achieved that parallel movements of the sphere, i. e. all lateral, upward and downward movements relatively to the liquid holder are suppressed, but that all rotary movements of the sphere within the liquid holder are as undisturbed and uninfluenced as if it floated by itself and were devoid of all weight. In this respect this novel form of suspension differs fundamentally from all known constructions as for example the mercury suspension of gyroscopic compasses, for in all of these known forms of suspension there is a centering means in which a solid part of the floating system is in contact with a solid part connected to, or forming a part of, the suspension member. Although the forces resulting from this contact between solid portions are extremely small, their elimination is nevertheless an important improvement, because in gyroscopic apparatus of extreme accuracy even the smallest forces have to be taken in account.

Another important advantage consists in the possibility of movements of unlimited angularity. Thus a flying machine equipped with a gyroscopic compass according to the invention may turn upside down in the air without a solid body striking against the submerged indicating system and disturbing its indication. Finally the advantage is obtained that the indicating system can be put into the apparatus in the simplest possible manner, this operation consisting in merely inserting the sphere into the liquid in which, when the apparatus is taken into use, it automatically assumes its proper position.

From the above description it will appear that in accordance with the invention the current for driving the gyroscope is conducted into the indicating system by the surrounding liquid, a drop of electrical potential being produced between the current carrying surfaces immersed in the liquid. The current carrying surfaces attached to the floating sphere are arranged so that the drop of potential produced between them is as great as possible, so that the greatest possible amount of electrical energy passes through the apparatus in the sphere. In order to make the resistance in the path of the current supplied by the battery as small as possible, the current conducting surfaces of the suspension member and of the floating system must be made comparatively large and the opposite surfaces must be placed as near as possible to each other. If continuous current is used for driving the gyroscopic system the arrangement will therefore be as described with reference to Fig. 1. If the gyroscopes are driven by three phase currents, the current conducting surfaces 11, 13 and 15 will each convey the current of one phase. In both cases, however, a part of the current will flow direct between the surfaces 9, 14 and 16 and this part of the current will be lost, i. e. it will not be available for the driving of the gyroscope. In order to keep these losses within permissible limits, the liquid must not be of a too high conductivity so that the resistance opposed to the stray current in the liquid may be high in comparison with the resistance in the operating circuit through the floating indicating system. To this end, i. e. to obtain a high resistance of the stray current path, the liquid holder may be fitted with two partitions or screening walls 21, 22 of insulation as indicated in section in Figs. 4 and 7. These insulating partitions serve to decrease the cross section or thickness of the layer of liquid without touching the floating body submerged therein. The function of the partitions 21 and 22 can be performed by the alternating current coils of Fig. 3, if their iron sheath is coated with insulation and they are arranged as near as possible to the surface of the sphere 12.

In accordance with a further feature of the invention the property of the liquid which consists in its forming a certain resistance to electric currents is also utilized for arrangements of the known kind comprising transmitter and receiver compasses in which the transmitter compass has a gyroscopic system which maintains a definite position relatively to the meridian and a second "follow up" system which turns with the ship, but is then always immediately turned back into a position that corresponds with the position of the gyroscopic system; i. e. the second system is always caused to "follow up". An arrangement in which the said property of the liquid is utilized is shown in Fig. 5, which is a horizontal section through the equator of the spherical float and the liquid container 5 corresponding to the similarly designated container or holder of Fig. 1. It is assumed that Fig. 5 shows the parts of a gyroscopic compass which are important for illustrating the feature of the invention that is now being discussed, all the other parts of the compass being omitted as unnecessary for the understanding of the invention. The current conducting surface which, in Fig. 1, is in the form of a ring 9 attached to the liquid holder 5, is altered in Fig. 5 to two short segments $9^a$, $9^b$, while the current conducting surface at the equator of the sphere is changed to a semi-circular surface 11. Futhermore an ammeter 23 is connected in the current path or branch between $9^a$ and the battery 8 and a second ammeter 24 is included in the branch between $9^b$ and 8. In other respects the circuits are similar to those of Fig. 1. When the parts are in the normal position shown in Fig. 5 the resistance of the gap at $9^a$ is the same as that at $9^b$, but if the liquid holder 5 is turned relatively to the floating body 11, say into the position shown in Fig. 6, the resistance of the gap at $9^a$ becomes larger and that at $9^b$ becomes smaller so that more current flows through the gap at $9^b$, and the pointer of the ammeter 24 is deflected more than that of 23. Now if, instead of the two ammeters 23 and 24, a current balance or bridge, or a differential relay is used, which controls the current of the "follow up" motor for turning the vessel 5 or liquid holder in such a manner that when the current in 23 preponderates the holder 5 is turned clockwise, but when the current in 24 preponderates the holder 5 is turned counter-clockwise, it will follow from Fig. 6 that the "follow up" motor will turn the holder counter-clockwise until the currents in the two said branches are again equal, or in other words until the normal relative position shown in Fig. 5 is regained. It is thus seen that, as in the case of known compass arrangements, in which the movements of the transmitter compass are transmitted to receiver compasses, the holder 5 is rotated so as to follow all relative rotations of the system 12, the follow up movements being produced by an external force, and the "follow up" motor transmitting these rotary movements to the receiver compasses.

It is to be understood that the embodiment illustrated in Fig. 7 is preferably provided with the connections illustrated in Figs. 5 and 6, whereby the casing 5 is caused to maintain a fixed relation with respect to the sphere 12.

The same result may be obtained in a similar manner with alternating or polyphase currents. For example, in Fig. 8 I have illustrated a three phase system. In this figure the numerals 9$^a$, 9$^b$, 11, 13, 14, 15 and 16 are used to designate parts which are the same as those designated by these numerals in other figures of the drawings already described. In this embodiment of the invention, the polyphase generator 27 supplies current to the conductors 14 and 16 inside the liquid container. The current from the two phases connected to these conductors flows through the liquid to the conductors 13 and 15. The third phase is connected to the contact surface 28 in the interior of the liquid container, similar contact surfaces being arranged opposite the surface 28 on the casing which contains the gyroscopic apparatus. In the reversing motor 29 there are three windings, the winding 30 being supplied with current continuously. The other two windings 31 and 32 are wound in opposite directions and they receive current from the contact surfaces 28, the conducting ring around the central portion of the container 11 and the contact surfaces 9$^a$ and 9$^b$. The return connection to the neutral point of the generator 27 is made through a condenser 33. As soon as the current in the winding 31 exceeds that in the winding 32 or conversely, the reversing motor will begin to rotate in one or the other direction and drive the direct shaft distributing roller 34 accordingly. In this manner, current impulses are transmitted through leads 35, 36 and 37 to the step by step motor 38 which serves to rotate the liquid container by means of the pinion 39 and the toothed wheel 40. This continues until the currents in 31 and 32 become equal whereupon the motion of the reversing motor stops.

The fact that the position of the liquid holder 5 can be made to permanently coincide with the position of the floating system 12 is particularly advantageous because it permits of the indication of the transmitter compass being read by the holder 5 alone. Consequently the system 12 need not be provided with a compass card or the like and in fact it need not be visible at all.

I claim:—

1. Gyroscopic apparatus comprising a liquid, a liquid holder, a gyrostatic system floating freely in the said liquid, and a force producing means acting through said liquid for keeping the gyrostatic system in its normal position in the said liquid and out of contact with the liquid holder and with any solid connected therewith.

2. Gyroscopic apparatus comprising a liquid, a liquid holder, a gyrostatic system floating freely in the said liquid, and a force producing means acting through said liquid and adapted to radiate a force for keeping the gyrostatic system in its normal position in the said liquid and out of contact with the liquid holder and with any solid connected therewith.

3. Gyroscopic apparatus comprising a liquid, a liquid holder, a gyrostatic system floating freely in the said liquid, and a force producing means acting through said liquid and adapted to radiate a magnetic force for keeping the gyrostatic system in its normal position in the said liquid and out of contact with the liquid holder and with any solid connected therewith.

4. Gyroscopic apparatus comprising a conducting liquid, a liquid holder, a gyrostatic system floating freely in the said liquid, electromagnets adapted to act upon the gyrostatic system and electric circuits including the said electro-magnets and said liquid and carrying currents whose strengths depend upon the position of the gyrostatic system relative to said electromagnets.

5. Gyroscopic apparatus comprising a conducting liquid, a liquid holder, a gyrostatic system floating freely in the said liquid, electromagnets of U-shaped cross section adapted to act upon the gyrostatic system and electric circuits including the said electromagnets and said liquid and carrying currents whose strengths depend upon the position of the gyrostatic system relative to said electromagnets.

6. Gyroscopic apparatus comprising a conducting liquid, a liquid holder, a gyrostatic system including a carrier consisting of a container floating freely in the said liquid, members having current conducting surfaces arranged on the exterior of the said carrier and adapted for conveying current into the said gyrostatic system through said liquid, means for producing a difference of electrical potential between the said current conducting surfaces, and a force producing means for keeping the gyrostatic system in its normal position in the said liquid and out of contact with the liquid holder and any solid connected therewith.

7. Gyroscopic apparatus comprising a conducting liquid, a liquid holder consisting of an electric insulator, a gyrostatic system including a carrier consisting of a container floating freely in the said liquid which liquid is a conductor of electricity, members arranged on the exterior of the said carrier and adapted for conveying current into the said gyrostatic system through said liquid, other current conducting surfaces arranged on the said liquid holder opposite to the current conducting surfaces on the said carrier, means for producing a difference of electrical potential between the current conducting surfaces on the said carrier, non-conducting partitions located between the said current conducting surfaces on the said carrier and arranged to diminish the cross section of the said liquid and a force producing means for keeping the gyrostatic system in its normal position in the said liquid and out of contact with the liquid holder and any solid connected therewith.

8. Gyroscopic apparatus comprising a conducting liquid, a liquid holder, a gyrostatic system floating freely in the said liquid and adapted to retain a certain position relatively to the meridian, a force producing means for keeping the gyrostatic system in its normal position in the said liquid and out of contact with the liquid holder and any solid connected therewith, a follow up system adapted to turn relatively to the said gyrostatic system, means forming electric circuits completed through the said liquid, a motor for turning the said follow up system and means so as to always keep it in the same position relatively to the gyrostatic system, and means controlled by currents in the said electric circuits for controlling the said motor.

9. Gyrostatic apparatus comprising a conducting liquid, a liquid holder, a gyrostatic system floating freely in the said liquid and adapted to retain a certain position relatively to the meridian, a force producing means for keeping the gyrostatic system in its normal position in the said liquid and out of contact with the liquid holder and any solid connected therewith, a follow up system adapted to turn relatively to the said gyrostatic system, means forming electric circuits completed through the said liquid, said circuits including current conducting surfaces attached to the gyrostatic system and to the follow up system which surfaces are adapted by their relative movement to alter the resistances of the said circuits, a motor for turning the said follow up system and means so as to always keep it in the same position relatively to the gyrostatic system, and means controlled by currents in the said electric circuits for controlling the said motor.

10. Gyroscopic apparatus comprising a liquid holder, a conducting liquid therein, a gyrostatic system floating freely in said liquid, a force producing means acting through said liquid for keeping said system out of contact with any solid body, a follow-up system comprising means forming electric circuits completed through the said liquid, a motor for turning said follow-up system, and means whereby said motor is controlled in accordance with changes in the relative position of said holder and system.

11. The combination of a liquid holder, a conducting liquid therein, a closed container submerged in said liquid and displacing a quantity thereof substantially equal to the weight of the said container, and means operable through said liquid for producing a force acting through said liquid tending to prevent said container from coming in contact with said liquid holder.

12. The combination of a liquid holder, a conducting liquid therein, a closed container submerged in said liquid and displacing a quantity thereof substantially equal to the weight of the said container, and means operable through said liquid for producing a force of repulsion acting through said liquid between the said container and said liquid holder.

13. The combination of a liquid holder, a conducting liquid therein, a closed container submerged in said liquid and displacing a quantity thereof substantially equal to the weight of the said container, and means within said container operable through said liquid for producing a force of repulsion acting through said liquid between the container and said liquid holder.

14. The combination of a liquid holder, a conducting liquid therein, a closed container submerged in said liquid and displacing a quantity thereof substantially equal to the weight of said container, and a plurality of alternating current coils within the said container adapted to cooperate with the said liquid holder and said liquid to produce a force of repulsion acting through said liquid between these parts.

15. The combination of a liquid holder, a conducting liquid therein, a closed container submerged in said liquid and displacing a quantity thereof substantially equal to the weight of the said container, gyroscopic apparatus within said container, a plurality of alternating current coils within the said container adapted to cooperate with the said liquid holder and said liquid to produce a force of repulsion acting through said liquid between these parts, and means for shielding the said apparatus from the magnetic flux produced by said coils.

16. Gyroscopic apparatus comprising a liquid holder, a liquid therein, a gyrostatic system floating freely in the said liquid, electromagnetic means arranged to act upon the gyrostatic system, electric circuits including the said electromagnetic means and means for supplying alternating currents to said circuits.

In witness whereof I have hereunto set my hand.

Dr. HERMANN ANSCHUTZ-KAEMPFE.